US 6,689,463 B2

(12) United States Patent
Chou et al.

(10) Patent No.: US 6,689,463 B2
(45) Date of Patent: Feb. 10, 2004

(54) SECONDARY COATING COMPOSITION FOR OPTICAL FIBERS

(75) Inventors: Kevin Y Chou, Painted Post, NY (US); Michelle D Fabian, Horseheads, NY (US); Jun Hou, Painted Post, NY (US); Gregory F Jacobs, Elmira, NY (US); David N Schissel, Painted Post, NY (US); Huan-Hung Sheng, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 10/029,618

(22) Filed: Dec. 18, 2001

(65) Prior Publication Data

US 2003/0113091 A1 Jun. 19, 2003

(51) Int. Cl.$^7$ .............................. C08F 2/50; B32B 17/10
(52) U.S. Cl. ................... 428/378; 428/380; 428/383; 428/391; 428/394; 428/388; 385/141; 385/144; 385/145; 385/147; 522/96; 522/6; 522/100; 522/150; 522/153; 522/168; 522/169; 522/170; 522/166; 522/167; 522/179; 522/181; 522/180
(58) Field of Search ................. 522/96, 6, 100, 522/150, 153, 168, 169, 170, 166, 167, 179, 181, 180; 385/141, 144, 145, 147; 428/378, 388, 380, 383, 391, 394

(56) References Cited

U.S. PATENT DOCUMENTS

| 3,864,203 A | 2/1975 | Marzocchi ................ 161/175 |
| 4,432,607 A | 2/1984 | Levy ........................ 350/96.34 |
| 4,492,428 A | 1/1985 | Levy .......................... 350/96.3 |
| 5,514,727 A | 5/1996 | Green et al. ................... 522/15 |
| 5,536,772 A | 7/1996 | Dillman et al. ............. 524/483 |
| 5,672,675 A | 9/1997 | Green et al. ................. 528/307 |

(List continued on next page.)

FOREIGN PATENT DOCUMENTS

| EP | 0244 500 A1 | 11/1987 | .......... C04B/41/00 |
| JP | 11-228697 | 8/1999 | |

OTHER PUBLICATIONS

Chapter II, Sections II–III of *Chemistry & Technology of UV & EB Formulation for Coatings, Inks & Paints, vol. II: Prepolymers & Reactive Diluents*, G. Webster Ed., J. Wiley & Sons, Chichester, W. Sussex, England. (1997) pp. 41–78.

(List continued on next page.)

Primary Examiner—James J. Seidleck
Assistant Examiner—Sanza L. McClendon
(74) Attorney, Agent, or Firm—Timothy R. Krogh; James V. Suggs (57) ABSTRACT

The present invention relates to a composition for coating optical fibers that includes a UV curable coating composition. The composition includes at least one component having at least one heterocyclic moiety capable of undergoing ring opening polymerization. The composition may also include at least one acrylate functional end group. The acrylate functional group may be on the same component as the heterocyclic moiety or on a second component. The cured composition has a Young's Modulus of at least about 100 MPa.

27 Claims, 1 Drawing Sheet

U.S. PATENT DOCUMENTS

| | | | |
|---|---|---|---|
| 5,674,922 A | * 10/1997 | Igarashi et al. | 522/168 |
| 5,721,020 A | * 2/1998 | Takami et al. | 427/508 |
| 5,913,004 A | * 6/1999 | Takase et al. | 385/123 |
| 5,985,952 A | 11/1999 | Levy | 522/102 |
| 5,993,965 A | 11/1999 | Flat et al. | 428/375 |
| 6,004,675 A | 12/1999 | Akasaka et al. | 428/375 |
| 6,042,943 A | 3/2000 | Levy | 428/378 |
| 6,166,101 A | * 12/2000 | Takami | 522/168 |
| 6,287,745 B1 | 9/2001 | Yamamura et al. | 430/269 |
| 6,289,158 B1 | 9/2001 | Blyler et al. | 385/128 |
| 6,292,612 B1 | 9/2001 | Golowich et al. | 385/124 |
| 6,292,613 B1 | 9/2001 | Fort | 385/128 |
| 6,301,415 B1 | * 10/2001 | Zahora et al. | 385/114 |
| 6,313,188 B1 | * 11/2001 | Takahashi | 522/25 |
| 6,319,603 B1 | * 11/2001 | Komiya et al. | 428/378 |
| 6,579,914 B1 | 6/2003 | Gantt et al. | |

OTHER PUBLICATIONS

Chemical Abstracts, vol. 91, No. 22, Nov. 26, 1979, Columbus, Ohio, US; abstract No. 176723, T. Kimura et al: "Primary coating materials of optical fiber" XP002041414 & Denki Tsushin Kenkyusho Kenkyo Jitsuyoka Kokoku, vol. 27, No. 11, 1978, pp. 2407–2419.

Patent Abstracts of Japan vol. 005, No. 102 (C–061), Jul. 2, 1981 & JP 56 043335A (Toho Rayon Co Ltd), Apr. 22, 1981.

"Radical Ring–Opening Polymerization" by Fumio Sanda, et al., Journal of Polymer Science: Part A: Polymer Chemistry, vol. 39, pp. 265–276, 2001.

"Aliphatic cyclic carbonates and spiroorthocarbonates as monomers" by G. Rokicki, Progress in Polymer Science 25, 2000, pp. 259–342.

"New developments of polymeric dental composites" by Norbert Moszner, et al., Progress in Polymer Science 26, 2001, 535–576.

* cited by examiner

SECONDARY COATING COMPOSITION FOR OPTICAL FIBERS

FIELD OF THE INVENTION

The present invention relates to compositions for optical fiber coatings and fiber optic ribbon matrices, optical fibers that contain a secondary coating prepared from such compositions, methods of making such optical fibers, and fiber optic ribbons that contain a matrix prepared from such compositions.

BACKGROUND OF THE INVENTION

Optical fibers have acquired an increasingly important role in the field of communications, frequently replacing existing copper wires. This trend has had a significant impact in local area networks (i.e., for fiber-to-home uses), which has seen a vast increase in the usage of optical fibers. Further increases in the use of optical fibers in local loop telephone and cable TV service are expected, as local fiber networks are established to deliver ever greater volumes of information in the form of data, audio, and video signals to residential and commercial users. In addition, use of optical fibers in home and commercial business environments for internal data, voice, and video communications has begun and is expected to increase.

Optical fibers typically contain a glass core and cladding, and at least two coatings, e.g., a primary (or inner) coating and a secondary (or outer) coating. The primary coating is applied directly to the glass fiber and, when cured, forms a soft, elastic, and compliant material which encapsulates the glass fiber. The primary coating serves as a buffer to cushion and protect the glass fiber core when the fiber is bent, cabled, or spooled. The secondary coating is applied over the primary coating and functions as a tough, protective outer layer that prevents damage to the glass fiber during processing and use.

Certain characteristics are desirable for the secondary coating. Before curing, the secondary coating composition should have a suitable viscosity and be capable of curing quickly to enable processing of the optical fiber. After curing, the secondary coating should have the following characteristics: sufficient stiffness (i.e., modulus) to protect the encapsulated glass fiber yet enough flexibility (i.e., elongation) for handling, low water absorption, low tackiness to enable handling of the optical fiber, chemical resistance, and sufficient adhesion to the primary coating.

To achieve the desired characteristics, conventional secondary coating compositions generally contain-urethane-based oligomers in large concentration, with monomers being introduced into the secondary coating composition as reactive diluents to lower the viscosity. Because conventional oligomeric components are, in general, much more expensive than the monomeric components, the use of oligomers in high concentration has the effect of increasing the cost of producing secondary coating compositions as well as the resulting optical fiber. Despite the cost of using oligomeric components in high concentration, it is believed that there are no commercially viable secondary coating compositions that either contain a low concentration or are completely devoid of oligomeric components.

Thus, there remains a need for suitable secondary coating compositions which can be prepared at lower cost than conventional secondary coating compositions and yield secondary coatings with a suitable modulus and other physical properties.

There is also a need for a coating that will reduce the sensitivity of the fiber to bending, particularly microbending. This is especially relevant for high data rate optical fiber. A high data rate fiber is typically a single mode fiber with a large effective area. Fibers with a large effective area have an increased signal mode transmission capacity in comparison to non-large effective area fibers. However, fibers with a large effective area have a greater sensitivity to stresses, such as stresses caused by bending the fiber. These stresses can lead to distortion of the optically active region of the fiber and result in microbend signal attenuation. There is a further need for a secondary optical fiber coating that has low shrinkage properties.

SUMMARY OF THE INVENTION

The present invention relates to a composition for coating optical fibers and optical fibers coated with the composition. A first embodiment of the inventive coating composition comprises at least one component having at least one acrylate functional end group and at least one heterocyclic moiety capable of undergoing ring opening polymerization, preferably the one component comprises either a monomer or an oligomer and wherein a Young's Modulus of said composition when cured comprises at least about 100 MPa. A further embodiment of the invention includes an optical fiber coated with the first embodiment of the inventive coating composition.

A second embodiment of the inventive coating composition comprises at least one component having at least one acrylate functional end group and a second component comprising at least one heterocyclic moiety capable of undergoing ring opening polymerization, wherein a Young's Modulus of said composition when cured comprises at least about 100 MPa. An additional embodiment of the invention comprises an optical fiber coated with the second embodiment of the inventive coating composition.

The composition of the present invention has suitable characteristics which enable its use in preparing the outer coating material on optical fibers and the matrix material on fiber optic ribbons. Moreover, when cured, the composition results in a coating or matrix material that possesses desirable characteristics with respect to water absorption, reduced microbend sensitivity, and lower extractables, as well as strength or modulus.

An advantage of the inventive coating composition is that the composition has low shrinkage stress due to its low cure shrinkage characteristics. The shrinkage stress applied to fiber due to the curing of the coatings is a product of the Young's modulus and the degree of shrinkage of the secondary coating, and the cross sectional area of the coating layer. The inventive coating will minimize the stress applied to the fiber by reducing the shrinkage the coating will exhibit during curing. A fiber coated with the inventive composition has improved microbend attenuation performance. Also a fiber coated with the inventive coating will not exhibit delamination between a primary coating and the inventive coating. Another advantage of the inventive composition is that composition may utilize ring opening polymerization and may also utilize free radical polymerization in combination with ring opening polymerization. Preferably the ring opening polymerization occurs simultaneously or after the free radical polymerization has initiated. Additionally the cured inventive coating can have a high modulus and a satisfactory cure speed.

DETAILED DESCRIPTION OF THE INVENTION

The present invention relates to a composition for coating optical fibers. It is preferred that the inventive composition is a thermoset which could include both UV and thermally initiated compositions and not a thermoplastic composition. The inventive composition includes at least one component having at least one heterocyclic moiety capable of undergoing ring opening polymerization. The component may preferably be an oligomer or a monomer, however, the component is not limited to only a monomer or an oligomer. Optionally the component may also include at least one acrylate functional end group. Optionally, the inventive coating may include at least one or more additional components capable of undergoing ring opening polymerization.

If the component does not include the acrylate functional group, preferably the composition includes a second component which includes at least one acrylate functional end group. Preferably, the second component comprises a monomer or an oligomer. In one embodiment of the invention, the second component comprises a urethane acrylate oligomer and the composition comprises less than about 10% of the urethane acrylate oligomer. However, the invention is not limited to having any particular percentage of urethane acrylate oligomer second component.

In one embodiment of the inventive composition, the component capable of ring opening polymerization comprises an oligomer and no more than about 20 wt. % of the composition, preferably no more than 10 wt. %. However, the invention is not limited to the inventive coating composition comprising any specific weight percent of the ring opening component.

Examples of classes of heterocyclic moieties capable of undergoing ring opening polymerization include cyclic carbonates (preferably 4, 5, 6, 7, or 8 member rings) cyclic disulfides, cyclic esters, epoxy group, cyclic thiocarbonates, spiroorthocarbonates, cyclic ethers, cyclic vinyl sulfone, cyclic vinyl disulfone methylene, spiroorthoesters, non-vinyl cyclic acetals and combinations thereof. The spiroorthocarbonates may be an alicyclic spiroorthocarbonates, e.g. 2,3,8,9-di(tetramethylene)-1,5,7,11-tetraoxaspiro[5.5] undecane.

Other examples of particular classes of components capable of undergoing ring opening polymerization comprises vinyloxirane, vinylthiirane, 4-methylen-1,3 dioxolane, cyclic arylsulfide, cyclic allyl sulfides, cyclic α-oxyacrylate, exo-methylene-substituted spiro orthocarbonates, exo-methylene-substituted spiro orthoesters, cyclic ketene acetals, bicyclic orthoesters, cycloaliphatic epoxides, oxetanes, difunctioal spiroorthocarbonates, cyclic vinyl acetal, 1,3-dioxolanes, 1,3-dioxepanes, oxetane functional silanes, spiroorthoester silanes, cyclophosphazenes, and combinations thereof.

Examples of particular suitable components that are capable of undergoing ring opening polymerization comprise lipoamide, cyclic vinyldisulfone, bifunctional vinyloxirane, 8-methylene-1,4-dioxaspiro-[4.5]deca-6,9-diene, vinylcyclopropanone cyclic acetal, dihydroxy spiroorthocarbonates, crystalline 3,9 dimethylene-1,5,7,11-tetraoxaspiro[5.5]undecane, 2,3-(bismethylene)-substituted spiroorthocarbonate, trans/trans-2,3,8,9-di(tetramethylene)-1,5,7,11-tetraspiro[5.5]undecane, 3,4 epoxycyclohexyl-methyl-3,4-epoxycyclohexanecarboxylate, 2-phenyl-4-methylene-1,3-dioxolane, 2-methylene-1,3-dioxepane, 2,2'bis[4-(2-hydroxy-3-methacryloxypropoxy)]phenyl propane, 6-methylene-1,4-dithiepane, 3-methylene-1,5-dithiacyclooctane, 1,2,3,4,6,7,8,-heptabromo-9-carbazoyl)-α-butyl methacrylate, 2,4,8,10-tetraoxaspiro[5,5]undecane-3-one, 5-benzoxymethyl-1,3-oxathiolane-2-thione, vinylcyclopropanone cyclic acetal, radiopaque cyclophosphazenes, aromatic cyclic carbonates, 1,4-dioxan-2-one, 2,3-(bismethylene)-substituted spiro orthocarbonate, 1,3-dioxan-2-ones, 1,3-dioxepan-2-one, cyclobis (alkylene carbonates) (e.g. cyclobis (tetramethylene carbonate) or cyclobis (hexamethylene carbonate)), 3-(methyldiethoxysilyl)propylsuccinic anhydride, octahydriodosilsesquioxane, and combinations thereof.

In one embodiment of the inventive coating composition, the composition does not comprise an epoxy ring. Preferably the inventive coating composition when cured has a Tg of above about 25° C., more preferably above about 35° C., even more preferably above about 45° C., and most preferably above about 50° C. The Tg may be determined by dynamic mechanical analysis (DMA) at a frequency of about 1 hertz. In one embodiment of the inventive coating composition, the composition is substantially devoid of a cationic cure initiator. However, if the embodiment of the coating includes one or more epoxy group ring opening moieties, preferably, the embodiment includes a cationic cure initiator.

In one embodiment of the invention, the composition of the present invention includes an oligomeric component present in an amount of about 15 weight percent or less and a monomeric component present in an amount of about 75 weight percent or more. The invention herein is not limited to a UV coating composition which comprises 15% or less of an oligomeric component. The inventive composition may include an oligomeric component of more than about 15%.

After curing, the cured product of the composition is characterized by a Young's modulus of at least about 100 MPa, preferably at least about 400 MPa, more preferably about 650 MPa, even more preferably at least about 900 MPa, and most preferably at least about 1000 MPa. Because of its physical characteristics, particularly its relatively high strength, the composition of the present invention is particularly suitable for use in preparing a secondary or outer coating of an optical fiber or a matrix of a fiber optic ribbon. Preferably, the elongation, tested in accordance with ASTM 882-97, of the inventive coating with a Young's modulus of at least 100 MPa comprises less than about 50%, more preferably less than about 40%, even more preferably less than about 35%, and most preferably about 5–30%.

As used herein, the weight percent of a particular component refers to the amount introduced into the bulk composition, excluding other additives. The amount of other additives that are introduced into the bulk composition to produce a composition of the present invention is listed in parts per hundred. For example, an oligomer, monomer, and photoinitiator are combined to form the bulk composition such that the total weight percent of these components equals 100 percent. To this bulk composition, an amount of an additive, for example 1.0 part per hundred of an antioxidant, is introduced in excess of the 100 weight percent of the bulk composition.

Because of substantial cost savings in reducing the oligomer content of optical fiber coating compositions, the major constituent of the composition of the present invention is the monomeric component and the minor constituent is the oligomeric component. This is contrary to most conventional secondary coating and/or matrix compositions, which contain an oligomeric component as the major constituent and a monomeric component as the minor constituent. In most conventional coating and/or matrix compositions, the oligomeric component typically functions as the backbone upon which polymerization occurs while the monomeric component functions as a diluent for controlling the viscosity of the composition and, during curing, as a cross-linking agent (depending upon the number of functional groups a particular monomeric constituent may have).

In the composition of the present invention, the monomeric component can include a single monomer or it can be a combination of two or more monomers. Although not required, it is preferable that the monomeric component be a combination of two or more monomers when the composition is substantially devoid of the oligomeric component. Preferably, the monomeric component introduced into the composition of the present invention comprises ethylenically unsaturated monomer(s). While the monomeric component can be present in an amount of 75 weight percent or more, it is preferably present in an amount of about 75 to about 99.2 weight percent, more preferably about 80 to about 99 weight percent, and most preferably about 85 to about 98 weight percent.

Ethylenically unsaturated monomers may contain various functional groups which enable their cross-linking. The ethylenically unsaturated monomers are preferably polyfunctional (i.e., each containing two or more functional groups), although monofunctional monomers can also be introduced into the composition. Therefore, the ethylenically unsaturated monomer can be a polyfunctional monomer, a monofunctional monomer, and mixtures thereof. Suitable functional groups for ethylenically unsaturated monomers used in accordance with the present invention include, without limitation, acrylates, methacrylates, acrylamides, N-vinyl amides, styrenes, vinyl ethers, vinyl esters, acid esters, and combinations thereof (i.e., for polyfunctional monomers).

Suitable polyfunctional ethylenically unsaturated monomers include, without limitation, alkoxylated bisphenol A diacrylates such as ethoxylated bisphenol A diacrylate with ethoxylation being 2 or greater, preferably ranging from 2 to about 30 (e.g. SR349 and SR601 available from Sartomer Company, Inc. West Chester, Pa. and Photomer 4025 and Photomer 4028, available from Henkel Corp. (Ambler, Pa.)), and propoxylated bisphenol A diacrylate with propoxylation being 2 or greater, preferably ranging from 2 to about 30; methylolpropane polyacrylates with and without alkoxylation such as ethoxylated trimethylolpropane triacrylate with ethoxylation being 3 or greater, preferably ranging from 3 to about 30 (e.g., Photomer 4149, Henkel Corp., and SR499, Sartomer Company, Inc.), propoxylated trimethylolpropane triacrylate with propoxylation being 3 or greater, preferably ranging from 3 to 30 (e.g., Photomer 4072, Henkel Corp. and SR492, Sartomer), and ditrimethylolpropane tetraacrylate (e.g., Photomer 4355, Henkel Corp.); alkoxylated glyceryl triacrylates such as propoxylated glyceryl triacrylate with propoxylation being 3 or greater (e.g., Photomer 4096, Henkel Corp. and SR9020, Sartomer); erythritol polyacrylates with and without alkoxylation, such as pentaerythritol tetraacrylate (e.g., SR295, available from Sartomer Company, Inc. (West Chester, Pa.)), ethoxylated pentaerythritol tetraacrylate (e.g., SR494, Sartomer Company, Inc.), and dipentaerythritol pentaacrylate (e.g., Photomer 4399, Henkel Corp., and SR399, Sartomer Company, Inc.); isocyanurate polyacrylates formed by reacting an appropriate functional isocyanurate with an acrylic acid or acryloyl chloride, such as tris-(2-hydroxyethyl) isocyanurate triacrylate (e.g., SR368, Sartomer Company, Inc.) and tris-(2-hydroxyethyl) isocyanurate diacrylate; alcohol polyacrylates with and without alkoxylation such as tricyclodecane dimethanol diacrylate (e.g., CD406, Sartomer Company, Inc.) and ethoxylated polyethylene glycol diacrylate with ethoxylation being 2 or greater, preferably ranging from about 2 to 30; epoxy acrylates formed by adding acrylate to bisphenol A diglycidylether (4 or more oxyethylene groups) and the like (e.g., Photomer 3016, Henkel Corp.); and single and multi-ring cyclic aromatic or non-aromatic polyacrylates such as dicyclopentadiene diacrylate and dicyclopentane diacrylate.

It may also be desirable to use certain amounts of monofunctional ethylenically unsaturated monomers, which can be introduced to influence the degree to which the cured product absorbs water, adheres to other coating materials, or behaves under stress. Exemplary monofunctional ethylenically unsaturated monomers include, without limitation, hydroxyalkyl acrylates such as 2-hydroxyethyl-acrylate, 2-hydroxypropyl-acrylate, and 2-hydroxybutyl-acrylate; long- and short-chain alkyl acrylates such as methyl acrylate, ethyl acrylate, propyl acrylate, isopropyl acrylate, butyl acrylate, amyl acrylate, isobutyl acrylate, t-butyl acrylate, pentyl acrylate, isoamyl acrylate, hexyl acrylate, heptyl acrylate, octyl acrylate, isooctyl acrylate, 2-ethylhexyl acrylate, nonyl acrylate, decyl acrylate, isodecyl acrylate, undecyl acrylate, dodecyl acrylate, lauryl acrylate, octadecyl acrylate, and stearyl acrylate; aminoalkyl acrylates such as dimethylaminoethyl acrylate, diethylaminoethyl acrylate, and 7-amino-3,7-dimethyloctyl acrylate; alkoxyalkyl acrylates such as butoxyethyl acrylate, phenoxyethyl acrylate (e.g., SR339, Sartomer Company, Inc.), and ethoxyethoxyethyl acrylate; single and multi-ring cyclic aromatic or non-aromatic acrylates such as cyclohexyl acrylate, benzyl acrylate, dicyclopentadiene acrylate, dicyclopentanyl acrylate, tricyclodecanyl acrylate, bornyl acrylate, isobornyl acrylate (e.g., SR423, Sartomer Company, Inc.), tetrahydrofurfuryl acrylate (e.g., SR285, Sartomer Company, Inc.), caprolactone acrylate (e.g., SR495, Sartomer Company, Inc.), and acryloylmorpholine; alcohol-based acrylates such as polyethylene glycol monoacrylate, polypropylene glycol monoacrylate, methoxyethylene glycol acrylate, methoxypolypropylene glycol acrylate, methoxypolyethylene glycol acrylate, ethoxydiethylene glycol acrylate, and various alkoxylated alkylphenol acrylates such as ethoxylated(4)nonylphenol acrylate (e.g., Photomer 4003, Henkel Corp.); acrylamides such as diacetone acrylamide, isobutoxymethyl acrylamide, N,N'-dimethyl-aminopropyl acrylamide, N,N-dimethyl acrylamide, N,N-diethyl acrylamide, and t-octyl acrylamide; vinylic compounds such as N-vinylpyrrolidone and N-vinylcaprolactam; and acid esters such as maleic acid ester and fumaric acid ester. With respect to the long and short chain alkyl acrylates listed above, a short chain alkyl acrylate is an alkyl group with 6 or less carbons and a long chain alkyl acrylate is an alkyl group with 7 or more carbons.

Most suitable monomers are either commercially available or readily synthesized using reaction schemes known in the art. For example, most of the above-listed monofunctional monomers can be synthesized by reacting an appropriate alcohol or amine with an acrylic acid or acryloyl chloride.

As previously indicated above, the minor constituent of the coating composition may be the oligomeric component. The oligomeric component can include a single type of oligomer or it can be a combination of two or more oligomers. When employed, if at all, the oligomeric component introduced into the compositions of the present invention preferably comprises ethylenically unsaturated oligomers. While the oligomeric component can be present in an amount of 15 weight percent or less, it is preferably present in an amount of about 13 weight percent or less, more preferably about 10 weight percent or less, even more preferably less than about 10 percent, and most preferably about 9 percent of less. While maintaining suitable physical characteristics of the composition and its resulting cured material, it is more cost-effective and, therefore, desirable to prepare compositions containing preferably less than about 5 weight percent or substantially devoid of the oligomeric component.

When employed, suitable oligomers can be either monofunctional oligomers or polyfunctional oligomers, although polyfunctional oligomers are preferred. The oligomeric component can also be a combination of a monofunctional oligomer and a polyfunctional oligomer.

Di-functional oligomers preferably have a structure according to formula (I) below:

$$F_1—R_1-[Diisocyanate-R_2-Diisocyanate]_m—R_1—F_1 \quad (I)$$

where $F_1$ is independently a reactive functional group such as acrylate, methacrylate, acrylamide, N-vinyl amide, styrene, vinyl ether, vinyl ester, or other functional group known in the art; $R_1$ includes, independently, $—C_{2-12}O—$, $—(C_{2-4}—O)_n—$, $—C_{2-12}O—(C_{2-4}—O)_n—$, $—C_{2-12}O—(CO—C_{2-5}O)_n—$, or $—C_{2-12}O—(CO—C_{2-5}NH)_n—$ where n is a whole number from 1 to 30, preferably 1 to 10; $R_2$ is polyether, polyester, polycarbonate, polyamide, polyurethane, polyurea, or combinations thereof; and m is a whole number from 1 to 10, preferably 1 to 5. In the structure of formula I, the diisocyanate group is the reaction product formed following bonding of a diisocyanate to $R_2$ and/or $R_1$. The term "independently" is used herein to indicate that each $F_1$ may differ from another $F_1$ and the same is true for each $R_1$.

Other polyfunctional oligomers preferably have a structure according to formula (II), formula (III), or formula (IV) as set forth below:

$$\text{multiisocyanate-}(R_2—R_1—F_2)_x \quad (II)$$

$$\text{polyol-[(diisocyanate-}R_2\text{-diisocyanate})_m—R_1—F_2]_x \quad (III)$$

or $$\text{multiisocyanate-}(R_1—F_2)_x \quad (IV)$$

where $F_2$ independently represents from 1 to 3 functional groups such as acrylate, methacrylate, acrylamide, N-vinyl amide, styrene, vinyl ether, vinyl ester, or other functional groups known in the art; $R_1$ can include $—C_{2-12}O—$, $—(C_{2-4}—O)_n—$, $—C_{2-12}O—(C_{2-4}—O)_n—$, $—C_{2-12}O—(CO—C_{2-5}O)_n—$, or $—C_{2-12}O—(CO—C_{2-5}NH)_n—$ where n is a whole number from 1 to 10, preferably 1 to 5; $R_2$ can be polyether, polyester, polycarbonate, polyamide, polyurethane, polyurea or combinations thereof; x is a whole number from 1 to 10, preferably 2 to 5; and m is a whole number from 1 to 10, preferably 1 to 5. In the structure of formula II, the multiisocyanate group is the reaction product formed following bonding of a multiisocyanate to $R_2$. Similarly, the diisocyanate group in the structure of formula III is the reaction product formed following bonding of a diisocyanate to $R_2$ and/or $R_1$.

Urethane oligomers are conventionally provided by reacting an aliphatic diisocyanate with a dihydric polyether or polyester, most typically a polyoxyalkylene glycol such as a polyethylene glycol. Such oligomers typically have between about four to about ten urethane groups and may be of high molecular weight, e.g., 2000–8000. However, lower molecular weight oligomers, having molecular weights in the 500–2000 range, may also be used. U.S. Pat. No. 4,608,409 to Coady et al. and U.S. Pat. No. 4,609,718 to Bishop et al., which are hereby incorporated by reference, describe such syntheses in detail.

When it is desirable to employ moisture-resistant oligomers, they may be synthesized in an analogous manner, except that the polar polyether or polyester glycols are avoided in favor of predominantly saturated and predominantly nonpolar aliphatic diols. These diols include, for example, alkane or alkylene diols of from about 2–250 carbon atoms and, preferably, are substantially free of ether or ester groups.

As is well known, polyurea components may be incorporated in oligomers prepared by these methods, simply by substituting diamines or polyamines for diols or polyols in the course of synthesis. The presence of minor proportions of polyurea components in the present coating systems is not considered detrimental to coating performance, provided only that the diamines or polyamines employed in the synthesis are sufficiently non-polar and saturated as to avoid compromising the moisture resistance of the system.

As is well known, optical fiber coating compositions may also contain a polymerization initiator which is suitable to cause polymerization (i.e., curing) of the composition after its application to a glass fiber or previously coated glass fiber. Polymerization initiators suitable for use in the compositions of the present invention include thermal initiators, chemical initiators, electron beam initiators, microwave initiators, actinic-radiation initiators, and photoinitiators. Particularly preferred are the photoinitiators. For most acrylate-based coating formulations, conventional photoinitiators, such as the known ketonic photoinitiating and/or phosphine oxide additives, are preferred. When used in the compositions of the present invention, the photoinitiator is present in an amount sufficient to provide rapid ultraviolet curing. Generally, this includes about 0.5 to about 10.0 weight percent, more preferably about 1.5 to about 7.5 weight percent.

The photoinitiator, when used in a small but effective amount to promote radiation cure, must provide reasonable cure speed without causing premature gelation of the coating composition. A desirable cure speed is any speed sufficient to cause substantial curing (i.e., greater than about 90%, more preferably 95%) of the coating composition. As measured in a dose versus modulus curve, a cure speed for coating thicknesses of about 25–35 $\mu$m is, e.g., less than 1.0 J/cm$^2$, preferably less than 0.5 J/cm$^2$.

Suitable photoinitiators include, without limitation, 1-hydroxycyclohexylphenyl ketone (e.g., Irgacure 184 available from Ciba Specialty Chemical (Tarrytown, N.Y.)), (2,6-dimethoxybenzoyl)-2,4,4-trimethylpentyl phosphine oxide (e.g., in commercial blends Irgacure 1800, 1850, and 1700, Ciba Specialty Chemical), 2,2-dimethoxy-2-phenyl acetophenone (e.g., Irgacure 651, Ciba Specialty Chemical), bis(2,4,6-trimethylbenzoyl)phenyl phosphine oxide (e.g., Irgacure 819, Ciba Specialty Chemical), (2,4,6-trimethylbenzoyl)diphenyl phosphine oxide (e.g., in commercial blend Darocur 4265, Ciba Specialty Chemical), 2-hydroxy-2-methyl-1-phenylpropane-1-one (e.g., in commercial blend Darocur 4265, Ciba Specialty Chemical) and combinations thereof. Other photoinitiators are continually being developed and used in coating compositions on glass fibers. Any suitable photoinitiator can be introduced into compositions of the present invention.

Optionally, the composition may include a cationic cure initiator. Preferably, the cationic cure initiator comprises a compound that initiates cationic polymerization of at least the ring opening material. For example of cationic cure initiators U.S. Pat. Nos. 6,287,745, 6,187,834, 5,696,179, 5,639,846, 5,536,529, and 5,352,712 are incorporated herein by reference in their entirety.

In addition to the above-described components, the secondary coating composition of the present invention can optionally include an additive or a combination of additives. Suitable additives include, without limitation, antioxidants, catalysts, lubricants, low molecular weight non-crosslinking resins, adhesion promoters, and stabilizers. Some additives can operate to control the polymerization process, thereby affecting the physical properties (e.g., modulus, glass transition temperature) of the polymerization product formed from the composition. Others can affect the integrity of the polymerization product of the composition (e.g., protect against de-polymerization or oxidative degradation).

A non-exhaustive list of optional preferred additives includes surfactants, surface agents, slip additives, waxes, micronized-polytetrafluoroethylene (hereinafter "micronized-PTFE"), and combinations thereof. Preferably a surfactant comprises a compound which includes one or more polar sections and one or more non-polar sections. A surfactant is not limited to only a compound which modifies surface conditions. preferably a surface agent is a particular type of surfactant which may be used to modify surface conditions.

A preferred antioxidant is thiodiethylene bis(3,5-di-tert-butyl)-4-hydroxyhydrocinnamate (e.g., Irganox 1035, available from Ciba Specialty Chemical).

A preferred adhesion promoter is an acrylated acid adhesion promoter such as Ebecryl 170 (available from UCB Radcure (Smyrna Ga.)).

Other suitable materials for use in secondary coating materials, as well as considerations related to selection of these materials, are well known in the art and are described in U.S. Pat. Nos. 4,962,992 and 5,104,433 to Chapin, which are hereby incorporated by reference. Various additives that enhance one or more properties of the coating can also be present, including the above-mentioned additives incorporated in the compositions of the present invention.

In one embodiment of the invention, the oligomeric component functions not as a backbone upon which polymerization occurs during curing of the compositions, but rather as a thickening agent to control viscosity of the final composition. As discussed hereinafter, preparation of optical fibers and fiber optic ribbons requires the composition of the present invention to be coated onto one or more previously coated glass fibers (i.e., using either wet-on-wet or wet-on-dry coating processes). To enable effective optical fiber and fiber optic ribbon production, the composition of the present invention should be sufficiently viscous at processing temperatures so that it remains on the coated glass fibers until it is cured. A suitable viscosity for the composition of the present invention is between about 250 and about 2500 centipoise at 45° C., preferably between about 300 and about 2000 centipoise at 45° C., more preferably between about 350 and about 1500 centipoise at 45° C.

Another aspect of the present invention relates to a coating or matrix material which is the cured product of a composition of the present invention.

In a further embodiment of the invention, the coating composition has a Young's Modulus that is at least about 1100 MPa, preferably the modulus is at least about 1300 MPa, more preferably the modulus is at least about 1700 MPa, and most preferably the modulus is at least about 2100 MPa.

A particularly useful characteristic of the coating or matrix material of the present invention is its ability to resist water absorption, since water absorption by the coating or matrix can eventually cause delamination of the coatings from the glass fiber and/or weakening of the matrix, which may result in signal attenuation. Therefore, water absorption by the coating or matrix material of the present invention should be less than about 5 percent, preferably less than about 3 percent, more preferably less than about 2 percent.

Another useful characteristic of the coating or matrix material is its ability to resist degradation or property changes following exposure to water. Thus, it is desirable for coating or matrix materials to contain a low percentage of water-extractable components. Preferably, the coating material will contain less than about 2 percent extractable components, preferably less than about 1 percent, and more preferably less than about 0.5 percent extractable components.

The inventive coating composition has an excellent application as a coating for a large effective area optical fiber, especially for fibers for high data rate, submarine, or terrestrial applications. A waveguide (a.k.a. optical fiber) having large effective area reduces non-linear optical effects, including self phase modulation, four wave mixing, cross phase modulation, and non-linear scattering processes, which can cause degradation of signals in high power systems. In general, a mathematical description of these non-linear effects includes the ratio, $P/A_{eff}$, where P is light power. For example, a non-linear optical effect can follow an equation containing a term, $\exp[PxL_{eff}/A_{eff}]$, where $L_{eff}$ is effective length. Thus, an increase in $A_{eff}$ produces a decrease in the non-linear contribution to the degradation of a light signal propagating in the waveguide. The requirement in the telecommunication industry for greater information capacity over long distances, without regenerators, has led to a reevaluation of single mode fiber refractive index profile design.

The focus of this reevaluation has been to provide optical waveguides that reduce non-linear effects such as those noted above and are optimized for the lower attenuation operating wavelength range around 1550 nm, i.e., the range from about 1250 nm to 1700 nm. In addition the waveguide should be compatible with optical amplifiers, and, retain the desirable properties of optical waveguides now deployed, such as, high strength, fatigue resistance, and bend resistance.

A waveguide fiber having at least two distinct refractive index segments has been found to have sufficient flexibility to meet or exceed the criteria for a high performance waveguide fiber system.

The effective area of a waveguide is in general increased by designing refractive index profiles that cause the light power distribution in the fiber to be shifted outwardly from the centerline of the waveguide fiber, thus reducing the power density. In moving the power distribution outwardly toward the core edge, however, the waveguide is made more susceptible to power losses due to bending of the fiber.

Many such high performance waveguide designs are inherently more susceptible to microbend induced attenuation losses of the transmitted signal. These microbend sensitive designs require coating systems such as those of the instant invention to mitigate microbend issues.

Definitions

The following definitions are in accord with common usage in the art.

The refractive index profile is the relationship between refractive index and waveguide fiber radius.

A segmented core is one that is divided into at least a first and a second waveguide fiber core portion or segment. Each portion or segment is located along a particular radial length, is substantially symmetric about the waveguide fiber centerline, and has an associated refractive index profile.

The effective area is $$A_{eff}=2\pi(\int E^2 r dr)^2/(\int E^4 r dr),$$

where the integration limits are 0 to ∞, and E is the electric field associated with light propagated in the waveguide. An effective diameter, $D_{eff}$, may be defined as, $$A_{eff}=\pi(D_{eff}/2)^2.$$

By large effective area, we mean that the effective area of the fiber is greater than about 60 $\mu m^2$, more preferably the effective area of the fiber is greater than about 65 $\mu m^2$, and most preferably the effective area of the fiber is greater than 70 $\mu m$ It is possible and preferable to have a fiber with an effective area of greater than about 80 to 90 $\mu m^2$.

The relative refractive index percent, $\Delta\%=100\times(n_i^2-n_c^2)/2n_i^2$ where $n_i$ is the maximum refractive index in region i, unless otherwise specified, and $n_c$ is the average refractive index of the cladding region unless otherwise specified.

The term α-profile refers to a refractive index profile, expressed in terms of $\Delta(b)\%$, where b is radius, which follows the equation, $$\Delta(b)\%=\Delta(b_o)(1-[|b-b_o|]/(b_f-b_o)]^\alpha),$$

where $b_o$ is the point at which $\alpha(b)\%$ is maximum, $b_f$ is the point at which $\alpha(b)\%$ is zero, and b is in the range $b_i \le b \le b_f$, where delta is defined above, $b_i$ is the initial point of the α-profile, $b_f$ is the final point of the α-profile, and α is an exponent which is a real number. The initial and final points of the α-profile are selected and entered into the computer model. As used herein, if an α-profile is preceded by a step index profile or any other profile shape, the beginning point of the α-profile is the intersection of the α-profile and the step profile or other profile.

It is further preferred that the large effective area fiber has a core radius of about 2 to about 6 $\mu m$, more preferably about 3 to about 5 $\mu m$.

Two examples of large effective area fibers which the inventive coating may be applied to include SMF-28™ and LEAF® fibers available from Corning, Incorporated of Corning, N.Y.

For additional disclosure on a large effective area fiber U.S. Provisional Patent Application granted serial No. 60/145,759, filed Jul. 27, 1999, and No. 60/165,833, filed Nov. 16, 1999, the specifications of which are incorporated herein by reference in their entirety.

Figure 1:
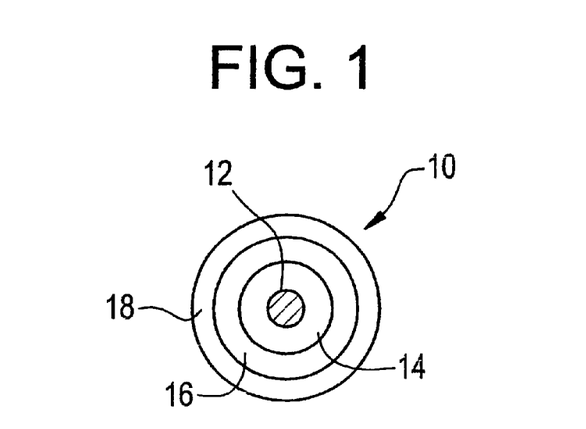
FIG. 1 is a cross-sectional view of an optical fiber of the present invention.

Another aspect of the present invention relates to an optical fiber prepared with a composition of the present invention. Referring to FIG. 1, the optical fiber 10 includes a glass core 12, a cladding layer 14 surrounding and adjacent to the glass core 12, a primary coating material 16 which encapsulates and adheres to the cladding layer 14, and one or more secondary (or outer) coating materials 18 encapsulating the primary coating material 16.

Any conventional material can be used to form the glass core 12, such as those described in U.S. Pat. No. 4,486,212 to Berkey, which is hereby incorporated by reference. The core is typically a silica based glass having a cylindrical cross section and a diameter ranging from about 5 to about 10 μm for single-mode fibers and about 20 to about 100 μm for multi-mode fibers. The core can optionally contain varying amounts of other material such as, e.g., oxides of titanium, thallium, germanium, and boron, which modify the core's refractive index. Other dopants which are known in the art can also be added to the glass core to modify its properties.

The primary coating material 16 is the polymerization product of any suitable primary coating composition. A number of suitable primary coating compositions are known in the art and others are continually being developed. Typically, such conventional primary coating compositions contain a high concentration of one or more oligomeric components (e.g., polyether urethane acrylate oligomers, polyester urethane acrylate oligomers, polyurea urethane acrylate oligomers, polyether acrylate oligomers, polyester acrylate oligomers, polyurea acrylate oligomers, epoxy acrylate oligomer, and hydrogenated polybutadiene oligomers), one or more monomeric components as reactive diluents or cross-linking agents, adhesion promoters which promote adhesion of the primary coating to the underlying glass fiber, polymerization initiators, and other known additives.

It is preferred that the primary coating is a soft coating having a low Young's modulus. Preferably, the Young's modulus of the primary coating is not more than 3.0 MPa, more preferably the Young's modulus is not more than 1.5 MPa, most preferably the Young's modulus is not more than 1.0 MPa. In the case that the secondary coating has a Young's modulus of more than about 1300 MPa, it is preferred that the primary coating includes a high molecular weight urethane acrylate oligomer (e.g. KWS6001 available from Bomar Speciality Co, Winsted, Conn.) and a caprolactone acrylate monomer (Tone M 100 available from Union Carbide Company, Danbury, Conn.). It is preferred that the caprolactone monomer is present in an amount greater than five (5) weight percent, and more preferably in an amount greater than fifteen (15) weight percent.

The secondary coating material 18 is the polymerization (i.e., cured) product of a composition of the present invention. The secondary coating material 18 can be a tight buffer coating or, alternatively, a loose tube coating. Irrespective of the type of secondary coating material employed, it is preferred that the outer surface of the secondary coating material 18 not be tacky so that adjacent convolutions of the optical fiber (i.e., on a process spool) can be unwound.

In one embodiment, the coefficient of friction of the secondary coating is reduced to no more than the aforementioned limits by the inclusion of a slip agent in the formulation of the secondary coating. Preferred slip agents include an organo-modified silicone acrylate (commercially available as Tegorad 2200 from Goldschmidt Chemical Co., (Hopewell, Va.)) or polyethylenepolypropyleneglycol glyceryl ether (commercially available as Acclaim 4220 from Lyondel, formerly known as Arco Chemicals, (Newtowne Square, Pa.)). However, the invention is not limited to the aforementioned slip agents.

It is also preferred that the secondary coating is part of a dual coating system. Optionally, the dual coating system will include a coloring material, such as a pigment or dye, or an additional colored ink coating.

An embodiment of the inventive coating may further include at least one of the aforementioned monomers and one of the aforementioned photoinitiators. The monomer or monomers is typically present in an amount of about forty (40) to about eighty-two (82) weight percent. In the case that the coating is a multiple monomer coating, each monomer is present in an amount of at least about five (5) weight percent and up to about seventy (70) weight percent. The photoinitiator is preferably present in an amount up to about six (6) weight percent. The more than about 15% oligomer coating may include the other additives as described with respect to the coating with up to about 15% of the oligomer in the total formulation, which includes oligomers, monomers, etc.

Another aspect of the present invention relates to a method of making an optical fiber of the present invention. Basically, this method can be performed by standard methods with the use of a composition of the present invention.

Briefly, the process involves fabricating the glass fiber (core 12 and cladding layer 14), applying a primary coating composition to the glass fiber, polymerizing the primary coating composition to form the primary coating material 16, applying a secondary coating composition to the coated glass fiber, and polymerizing the secondary coating composition to form the secondary coating material 18. Optionally, the secondary coating composition can be applied to the coated fiber before polymerizing the primary coating composition, in which case only a single polymerization step is employed.

The core and cladding layer may be typically produced in a single operation or multi-step operation by methods which are well known in the art. Suitable methods include: the double crucible method as described, for example, in Midwinter, *Optical Fibers for Transmission*, New York, John Wiley, pp. 166–178 (1979), which is hereby incorporated by reference; rod-in-tube procedures; and doped deposited silica processes, also commonly referred to as chemical vapor deposition ("CVD") or vapor phase oxidation. A variety of CVD processes are known and are suitable for producing the core and cladding layer used in the optical fibers of the present invention. They include external CVD processes (Blankenship et al., "The Outside Vapor Deposition Method of Fabricating Optical Waveguide Fibers," *IEEE J. Quantum Electron.*, 18:1418–1423 (1982), which is hereby incorporated by reference), axial vapor deposition processes (Inada, "Recent Progress in Fiber Fabrication Techniques by Vapor-phase Axial Deposition," *IEEE J. Quantum Electron.* 18:1424–1431 (1982), which is hereby incorporated by reference), and modified CVD or inside vapor deposition (Nagel et al., "An Overview of the Modified Chemical Vapor Deposition (MCVD) Process and Performance," *IEEE J. Quantum Electron.* 18:459–476 (1982), which is hereby incorporated by reference).

The primary and secondary coating compositions are coated on a glass fiber using conventional processes, for example, on a draw tower.

The glass fibers may be drawn from a specially prepared, cylindrical preform which has been locally and symmetrically heated to a temperature sufficient to soften the glass, e.g., of about 2000° C. for a silica glass. As the preform is heated, such as by feeding the preform into and through a furnace, a glass fiber is drawn from the molten material. The primary and secondary coating compositions are applied to the glass fiber after it has been drawn from the preform, preferably immediately after cooling. The coating compositions are then cured to produce the coated optical fiber. The method of curing can be thermal, chemical, or radiation induced, such as by exposing the applied (and uncured) coating composition on the glass fiber to ultraviolet light, actinic radiation, microwave radiation, or electron beam, depending upon the nature of the coating composition(s) and polymerization initiator being employed. It is frequently advantageous to apply both the primary coating composition and any secondary coating compositions in sequence following the draw process. One method of applying dual layers of coating compositions to a moving glass fiber is disclosed in U.S. Pat. No. 4,474,830 to Taylor, which is hereby incorporated by reference. Another method for applying dual layers of coating compositions onto a glass fiber is disclosed in U.S. Pat. No. 4,581,165 to Rannell et al., which is hereby incorporated by reference. Of course, the primary coating composition can be applied and cured to form the primary coating material 16, then the secondary coating composition(s) can be applied and cured to form the secondary coating material 18.

Still another aspect of the present invention relates to a fiber optic ribbon. The ribbon includes a plurality of substantially planar, substantially aligned optical fibers and a matrix encapsulating the plurality of optical fibers. The matrix is the cured product of a composition of the present invention.

Figure 2:
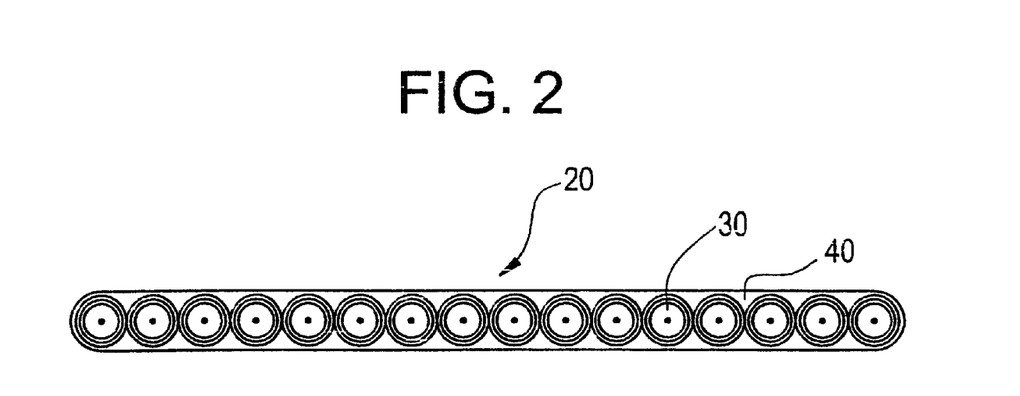
FIG. 2 is a cross-sectional view of a fiber optic ribbon of the present invention.

One embodiment of this aspect of the present invention is illustrated in FIG. 2. As shown there, fiber optic ribbon 20 of the present invention includes a plurality of single or multi-layered optical fibers 30 substantially aligned relative to one another in a substantially planar relationship and encapsulated by matrix 40. By substantially planar, it is intended that optical fibers 30 are not displaced from a common plane by a distance of more than about one-half the diameter thereof. By substantially aligned, it is intended that the optical fibers 30 are generally parallel and co-planar with other optical fibers along the length of the fiber optic ribbon 20. In FIG. 2, the fiber optic ribbon 20 contains sixteen (16) optical fibers 30; however, it should be apparent to those skilled in the art that any number of optical fibers 30 (e.g., two or more) may be employed to form fiber optic ribbon 20 disposed for a particular use.

The fiber optic ribbons of the present invention may be encapsulated by the matrix 40 in any known configuration (e.g., edge-bonded ribbon, thin-encapsulated ribbon, thicken-capsulated ribbon, or multi-layer ribbon) by conventional methods of making fiber optic ribbons.

Basically, the fiber optic ribbon is prepared by standard methods using the composition of the present invention. For example, upon alignment of a plurality of substantially planar optical fibers, the composition of the present invention can be applied and cured according to the methods of preparing optical fiber ribbons as described in U.S. Pat. No. 4,752,112 to Mayr and U.S. Pat. No. 5,486,378 to Oestreich et al., which are hereby incorporated by reference.

Although the invention has been described in detail for the purpose of illustration, it is understood that such detail is solely for that purpose, and variations can be made therein by those skilled in the art without departing from the spirit and scope of the invention which is defined by the following claims.

What is claimed:

1. An optical fiber coating composition comprising:
   at least one component having at least one acrylate functional end group and at least one heterocyclic moiety capable of undergoing ring opening polymerization, wherein the heterocyclic moiety is not an epoxy ring; wherein said one component comprises either a monomer or an oligomer; and wherein a Young's Modulus of said composition when cured comprises at least about 100 MPa.

2. The composition according to claim 1 wherein said component is an oligomer and wherein the composition further comprises a monomer having at least one acrylate functional end group and at least one heterocyclic moiety capable of undergoing ring opening polymerization.

3. The composition according to claim 1 wherein said component is an oligomer and a concentration of said oligomer in said composition is less than about 20%.

4. The composition according to claim 1 wherein said component is a monomer and said composition further comprises a urethane acrylate oligomer present in a concentration of less than about 10%.

5. The composition according to claim 1 wherein said heterocyclic moiety is selected from the group consisting of cyclic carbonates, cyclic disulfides, cyclic esters, non-epoxide cyclic ethers, cyclic thiocarbonates, cyclic vinyl sulfone, cyclic vinyl disulfone methylene, spiroorthocarbonates, spiroorthoesters, vinyloxiranes, vinylthiirane, 4-methylene-1,3 dioxolanes, cyclic arylsulfides, cyclic allyl sulfides, cyclic α-oxyacrylates, exo-methylene-substituted spiroorthocarbonates, exo-methylene-substituted spiroorthoesters, cyclic ketene acetals, bicyclic orthoesters, oxetanes, difunctional spiroorthocarbonates, non-vinyl cyclic acetals, cyclic vinyl acetals, 1,3-dioxolanes, 1,3-dioxepanes, oxetane functional silanes, spiroorthoester silanes, cyclophosphazenes, and combinations thereof.

6. The composition according to claim 1 wherein said moiety comprises at least an alicyclic spiroorthocarbonate.

7. The composition according to claim 6 wherein said alicyclic spiroorthocarbonate is a 2,3,8,9-di(tetramethylene)-1,5,7,11-tetraoxaspiro[5.5]undecane.

8. The composition according to claim 1 wherein said component is a 2,3,8,9-di(tetramethylene)-1,5,7,11-tetraoxaspiro[5.5]undecane or a 2,2'-bis[4-(2-hydroxy-3-methacryloxypropoxy)]phenyl propane.

9. The composition according to claim 1, wherein the composition when cured has a Tg above 25° C.

10. The composition according to claim 1 wherein said component is a monomer.

11. The composition according to claim 10 wherein said monomer has one or more epoxy functional groups and said composition further comprises an urethane acrylate monomer.

12. The composition according to claim 1 further comprising a cationic photo-initiator and a free radical photo-initiator.

13. The composition according to claim 1 wherein said moiety comprises at least one spiroorthocarbonate.

14. The composition according to claim 1 wherein said composition is substantially free of a cationic photo-initiator.

15. The composition according to claim 1 further comprising a second component comprising at least one heterocyclic moiety capable of undergoing ring-opening polymerization.

16. The composition according to claim 15 wherein said at least one component is an oligomer and said second component is a monomer.

17. The composition according to claim 1 wherein said heterocyclic moiety comprises at least one of the following compounds: lipoamide, cyclic vinyldisulfone, bifunctional vinyloxirane, 8-methylene-1,4-dioxaspiro-[4.5]deca-6,9-diene, vinylcyclopropanone cyclic acetal, dihydroxy spiroorthocarbonates, crystalline 3,9 dimethylene-1,5,7,11-tetraoxaspiro [5.5]undecane, 2,3-(bismethylene)-substituted spiroorthocarbonate, trans/trans-2,3,8,9-di(tetramethylene)-1,5,7,11-tetraaspiro [5.5]undecane, 2-phenyl-4-methylene-1,3-dioxolane, 2-methylene-1,3-dioxepane, 6-methylene-1,4-dithiepane, 3-methylene-1,5-dithiacyclooctane, 1,2,3,4,6,7,8,-heptabromo-9-carbazoyl)-α-butyl methacrylate, 2,4,8,10-tetraoxaspiro[5,5]undecane-3-one, 5-benzoxymethyl-1,3-oxathiolane-2-thione, vinylcyclopropanone cyclic acetal, radiopaque cyclophosphazenes, aromatic cyclic carbonates, 1,4-dioxan-2-one, 2,3-(bismethylene)-substituted spiro orthocarbonate, 1,3-dioxan-2-ones, 1,3-dioxepan-2-one, cyclobis (alkylene carbonates), 3-(methyldiethoxysilyl) propylsuccinic anhydride, octahydriodosilsesquioxane, and combinations thereof.

18. A coated optical fiber comprising at least one coating that is the cured product of the coating composition of claim 1.

19. An optical fiber coating composition comprising:
at least one component having at least one acrylate functional end group; and
a second component comprising at least one heterocyclic moiety capable of undergoing ring opening polymerization, wherein the heterocyclic moiety is not an epoxy ring, and wherein a Young's Modulus of said composition when cured is at least about 100 MPa.

20. The composition according to claim 19 wherein said second component comprises at least one of the following: cyclic disulfides, cyclic carbonates, cyclic esters, cyclic thiocarbonates, vinyloxiranes, vinylthiiranes, 4-methylen-1,3 dioxolanes, cyclic arylsulfides, cyclic allyl sulfides, cyclic α-oxyacrylates, exo-methylene-substituted spiro orthocarbonates, exo-methylene-substituted spiro orthoesters, cyclic ketene acetals, bicyclic orthoesters, oxetanes, difunctional spiroorthocarbonates, cyclic vinyl acetals, 1,3-dioxolanes, 1,3-dioxepanes, oxetane functional silanes, spiroorthoester silanes, cyclophosphazenes, non-epoxide cyclic ethers, cyclic vinyl sulfone, cyclic vinyl disulfone methylene, spiroorthoesters, non-vinyl cyclic acetals, and combinations thereof.

21. The composition according to claim 19 wherein said second component comprises at least one of lipoamide, cyclic vinyldisulfone, bifunctional vinyloxirane, 8-methylene-1,4-dioxaspiro-[4,5]deca-6,9-diene, vinylcyclopropanone cyclic acetal, dihydroxy spiroorthocarbonates, crystalline 3,9 dimethylene-1,5,7,11-tetraoxaspiro [5.5] undecane, 2,3-(bismethylene)-substituted spiroorthocarbonate, trans/trans-2,3,8,9-di(tetramethylene)-1,5,7,11-tetraaspiro [5.5]undecane, 2-phenyl 4 methylene-1, 3-dioxolane, 2-methylene-1,3-dioxepane, 6-methylene-1,4-dithiepane, 3-methylene-1,5-dithiacyclooctane, 1,2,3,4,6,7, 8,-heptabromo-9-carbazoyl)-α-butyl methacrylate, 2,4,8,10-tetraoxaspiro[5,5]undecane-3-one, 5-benzoxymethyl-1,3-oxathiolane-2-thione, vinylcyclopropanone cyclic acetal, radiopaque cyclophosphazenes, aromatic cyclic carbonates, 1,4-dioxan-2-one, 2,3-(bismethylene)-substituted spiro orthocarbonate, 1,3-dioxan-2-ones, 1,3-dioxepan-2-one, cyclobis (alkylene carbonates), 3-(methyldiethoxysilyl) propylsuccinic anhydride, octahydriodosilsesquioxane, and combinations thereof.

22. The composition according to claim 19 wherein said second component is an oligomer present in a concentration of less than about 20%.

23. The composition according to claim 19 wherein said second component is a monomer and said first component is a urethane acrylate oligomer present in a concentration of less than about 10%.

24. The composition according to claim 19 wherein said second component comprises at least an alicyclic spiroorthocarbonate.

25. The composition according to claim 24 wherein said alicyclic spiroorthocarbonate comprises 2,3,8,9-di (tetramethylene)-1,5,7,11-tetraoxaspiro[5.5]undecane.

26. The composition according to claim 19 wherein said second component is a 2,3,8,9-di(tetramethylene)-1,5,7,11-tetraoxaspiro[5.5]undecane, or a 2,2'-bis[4-(2-hydroxy-3-methacryloxypropoxy)]phenyl propane.

27. A coated optical fiber having at least one coating that is the cured reaction product of a curable composition in accordance with claim 19.

* * * * *